(12) United States Patent
Nakagawa et al.

(10) Patent No.: US 7,962,943 B2
(45) Date of Patent: Jun. 14, 2011

(54) VIDEO PICTURE INFORMATION DELIVERING APPARATUS AND RECEIVING APPARATUS

(75) Inventors: Akira Nakagawa, Kawasaki (JP); Atsushi Ichiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1075 days.

(21) Appl. No.: 10/940,847

(22) Filed: Sep. 15, 2004

(65) Prior Publication Data

US 2005/0034163 A1    Feb. 10, 2005

Related U.S. Application Data

(63) Continuation of application No. PCT/JP02/02477, filed on Mar. 15, 2002.

(51) Int. Cl.
*H04N 7/173* (2006.01)

(52) U.S. Cl. .............. 725/93; 725/32; 725/34; 725/36; 725/90; 725/102

(58) Field of Classification Search ............. 725/93, 725/22, 32, 34–36, 88–90
See application file for complete search history.

(56) References Cited

U.S. PATENT DOCUMENTS

| | | | |
|---|---|---|---|
| 6,233,389 B1 * | 5/2001 | Barton et al. | 386/232 |
| 6,498,816 B1 * | 12/2002 | Easwar et al. | 375/240.26 |
| 6,788,882 B1 | 9/2004 | Geer | |
| 7,194,032 B1 * | 3/2007 | Easwar et al. | 375/240.12 |
| 7,292,773 B2 * | 11/2007 | Angel | 386/68 |
| 2001/0049820 A1 | 12/2001 | Barton et al. | |
| 2002/0023167 A1 * | 2/2002 | Kurihara et al. | 709/231 |
| 2002/0069408 A1 | 6/2002 | Abe et al. | |
| 2002/0150380 A1 | 10/2002 | Shigetomi | |
| 2003/0088872 A1 * | 5/2003 | Maissel et al. | 725/46 |
| 2005/0076359 A1 | 4/2005 | Pierson | |
| 2008/0022296 A1 * | 1/2008 | Iggulden | 725/22 |

FOREIGN PATENT DOCUMENTS

| | | |
|---|---|---|
| EP | 0920208 | 6/1999 |
| EP | 1182890 | 2/2002 |
| JP | 4-337548 | 11/1992 |
| JP | 8-320878 | 12/1996 |
| JP | 9-275555 | 10/1997 |
| JP | 2000-115712 | 4/2000 |
| JP | 2000-165335 | 6/2000 |
| JP | 2000-197032 | 7/2000 |
| JP | 2001-195807 | 7/2001 |

(Continued)

OTHER PUBLICATIONS

Chinese Patent Office Action, mailed Oct. 27, 2006, and issued in corresponding Chinese Patent Application No. 028285581.

(Continued)

*Primary Examiner* — Joseph P Hirl
*Assistant Examiner* — Jivka Rabovianski
(74) *Attorney, Agent, or Firm* — Fujitsu Patent Center

(57) ABSTRACT

A video picture information delivering apparatus delivers moving pictures according to a request from a terminal device. The apparatus comprises a determining unit for determining whether or not a predetermined particular picture is included in some of moving pictures to be skipped, upon receipt of a request to skip the some of the moving pictures; and a transmitting unit for transmitting to the terminal device associated information corresponding to the particular picture along with the moving pictures after being skipped, if the particular picture is included in the some of the skipped moving pictures.

6 Claims, 18 Drawing Sheets

FOREIGN PATENT DOCUMENTS

| | | |
|---|---|---|
| JP | 2001-230996 | 8/2001 |
| JP | 2001-266482 | 9/2001 |
| JP | 2001-325180 | 11/2001 |
| JP | 2002-10237 | 1/2002 |
| JP | 2002-44043 | 2/2002 |
| JP | 2002-125215 | 4/2002 |
| WO | WO-01/58158 | 8/2001 |
| WO | WO-01/89209 | 11/2001 |

OTHER PUBLICATIONS

Chinese Patent Office Action, mailed Feb. 17, 2006, and issued in corresponding Chinese Patent Application No. 028285581.

Korean Office Action mailed Jun. 20, 2006 in corresponding Korean Patent Application No. 10-2004-7014466.

"European Supplementary Search Report", dated Apr. 22, 2009, European App. No. 02705239.8.

USPTO, "U.S. Appl. No. 12/116,711 (DIV of U.S. Appl. No. 10/940,847)", [CTNF] Non-Final Rejection Aug. 6, 2009.

U.S. Appl. No. 12/116,711, filed May 7, 2008, Divisional under 37 CFR §1.53(b).

USPTO, [Rabovianski] U.S. Appl. No. 12/116,711 (Div of U.S. Appl. No. 10/940,847), [CTNF] Non-Final Office Action mailed Feb. 3, 2011.

USPTO, [Rabovianski] U.S. Appl. No. 12/116,711 (Div of U.S. Appl. No. 10/940,847), [CTFR] Final Office Action mailed May 7, 2010.

Japan Patent Office: Office Action issued Nov. 6, 2007 in corresponding JP Patent Application No. 2003-577543, with partial English-language translation (Previously Submitted).

\* cited by examiner

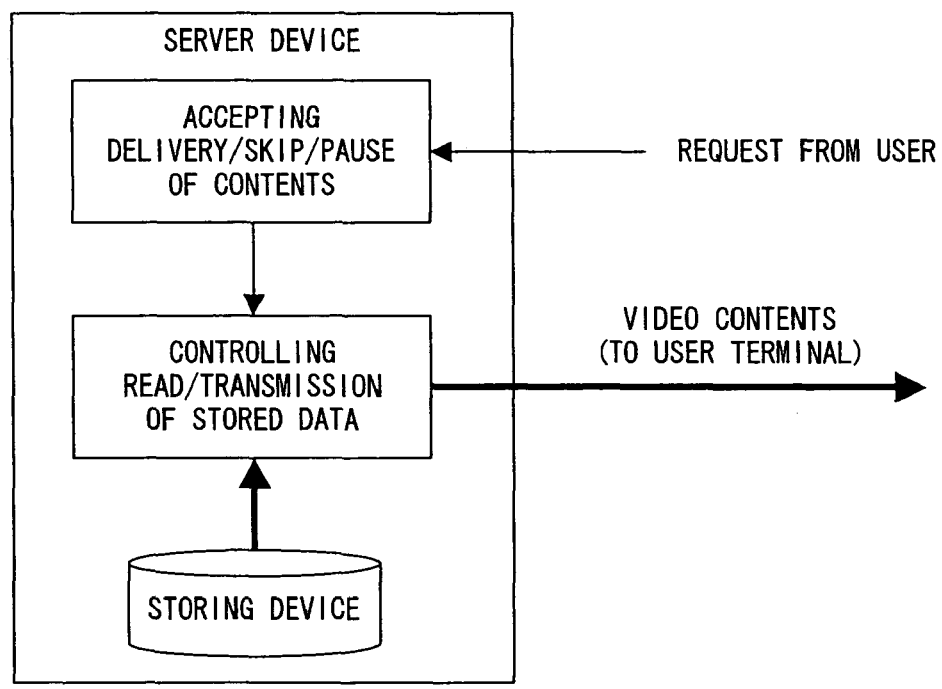
F I G. 1

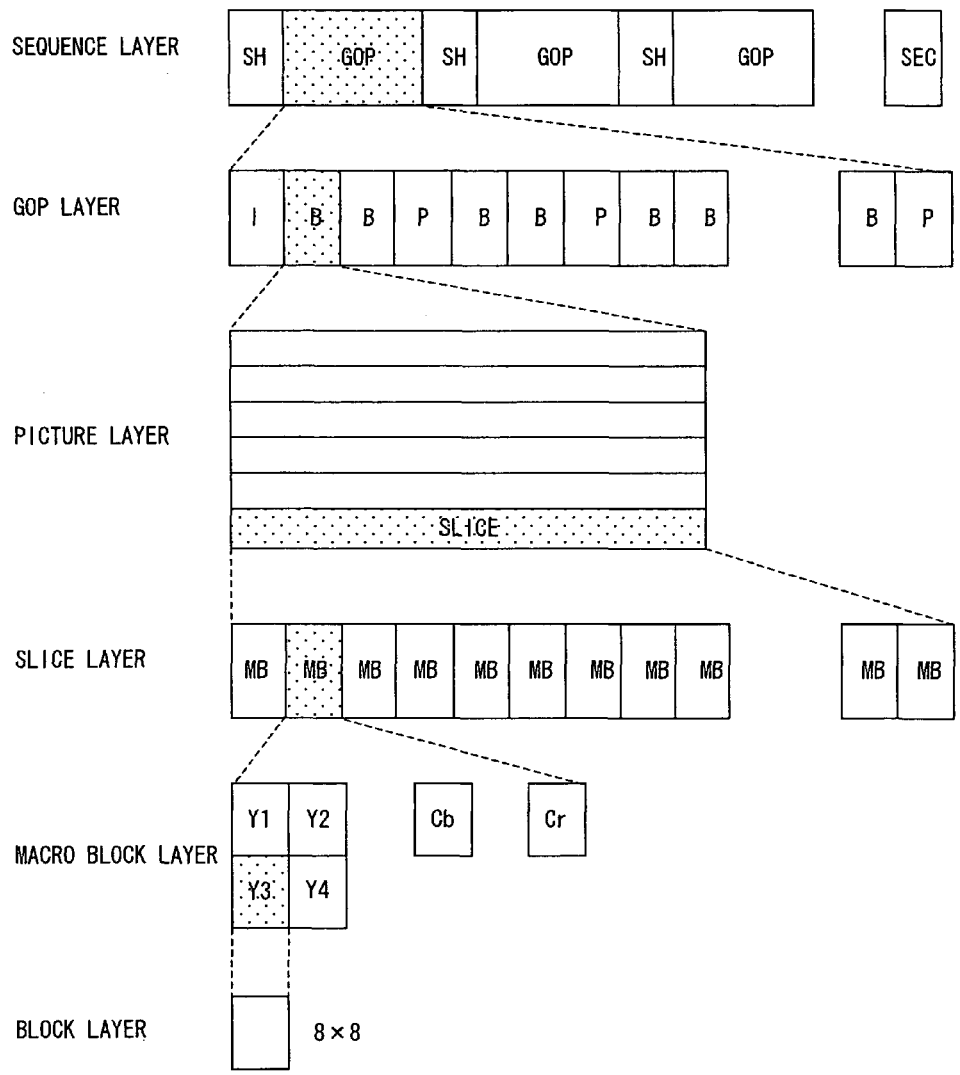
F I G. 3

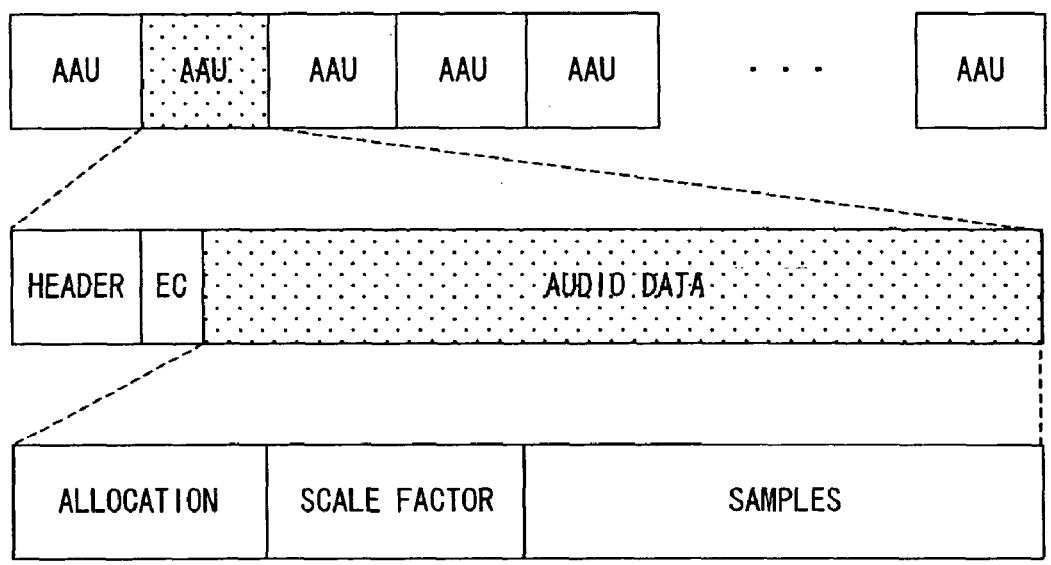
F I G. 4

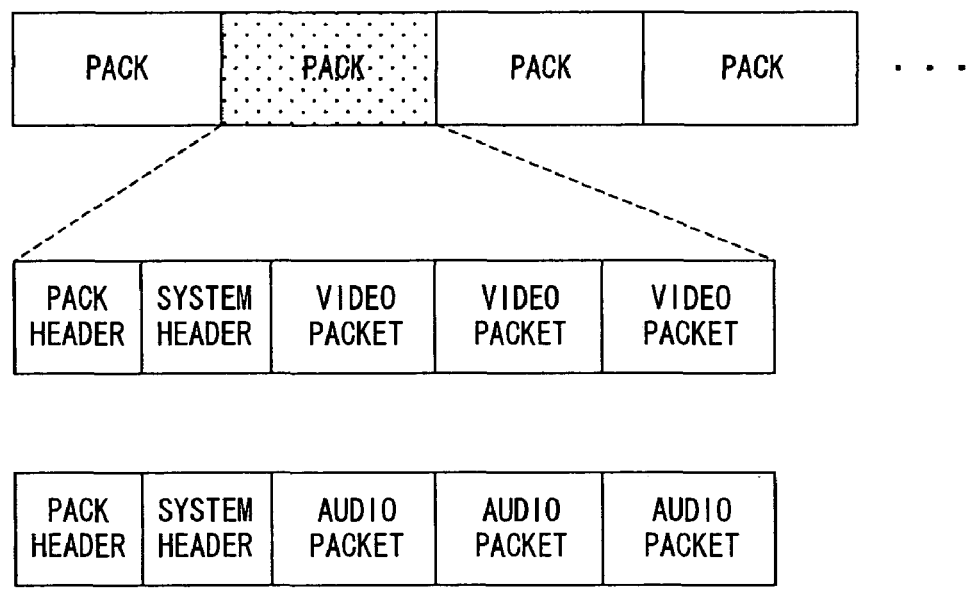
F I G. 5

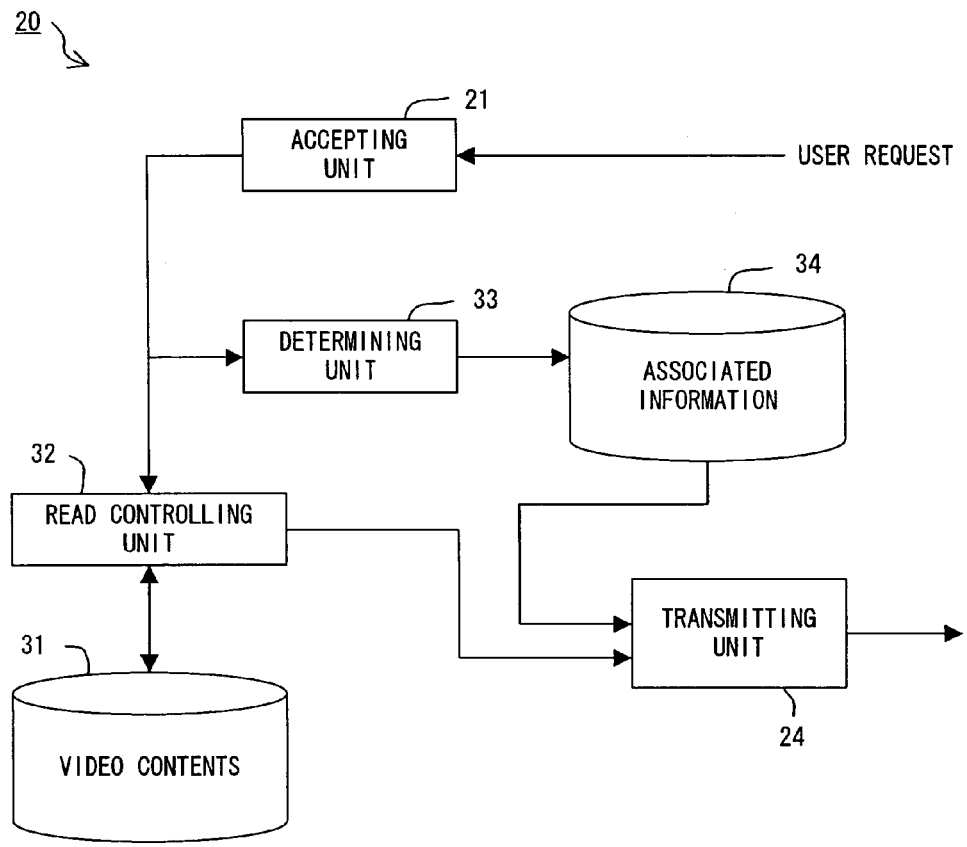
F I G. 6

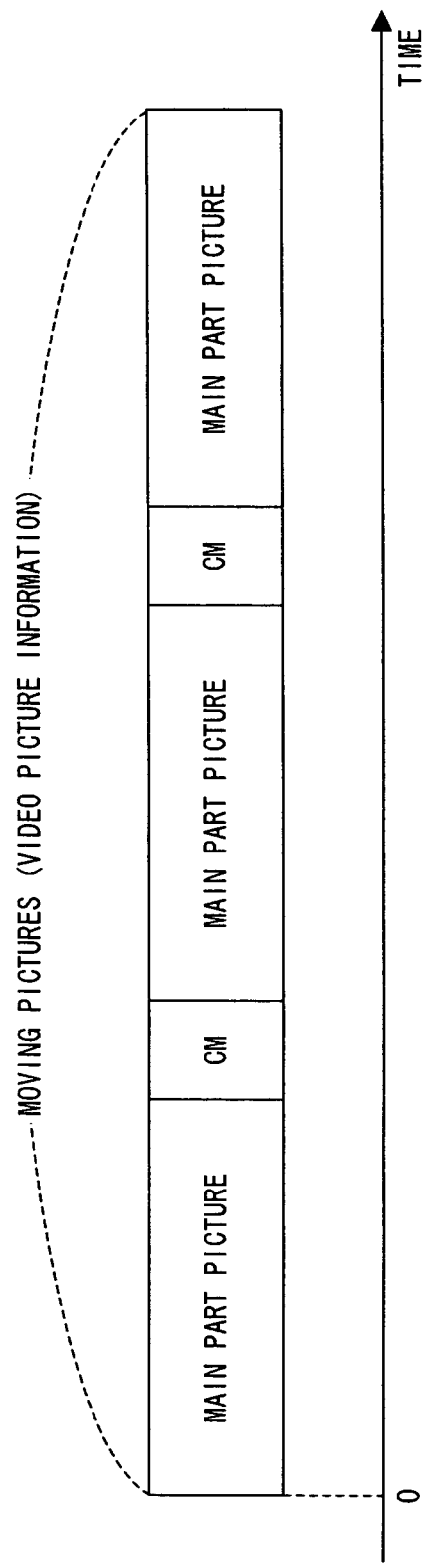
F I G. 7

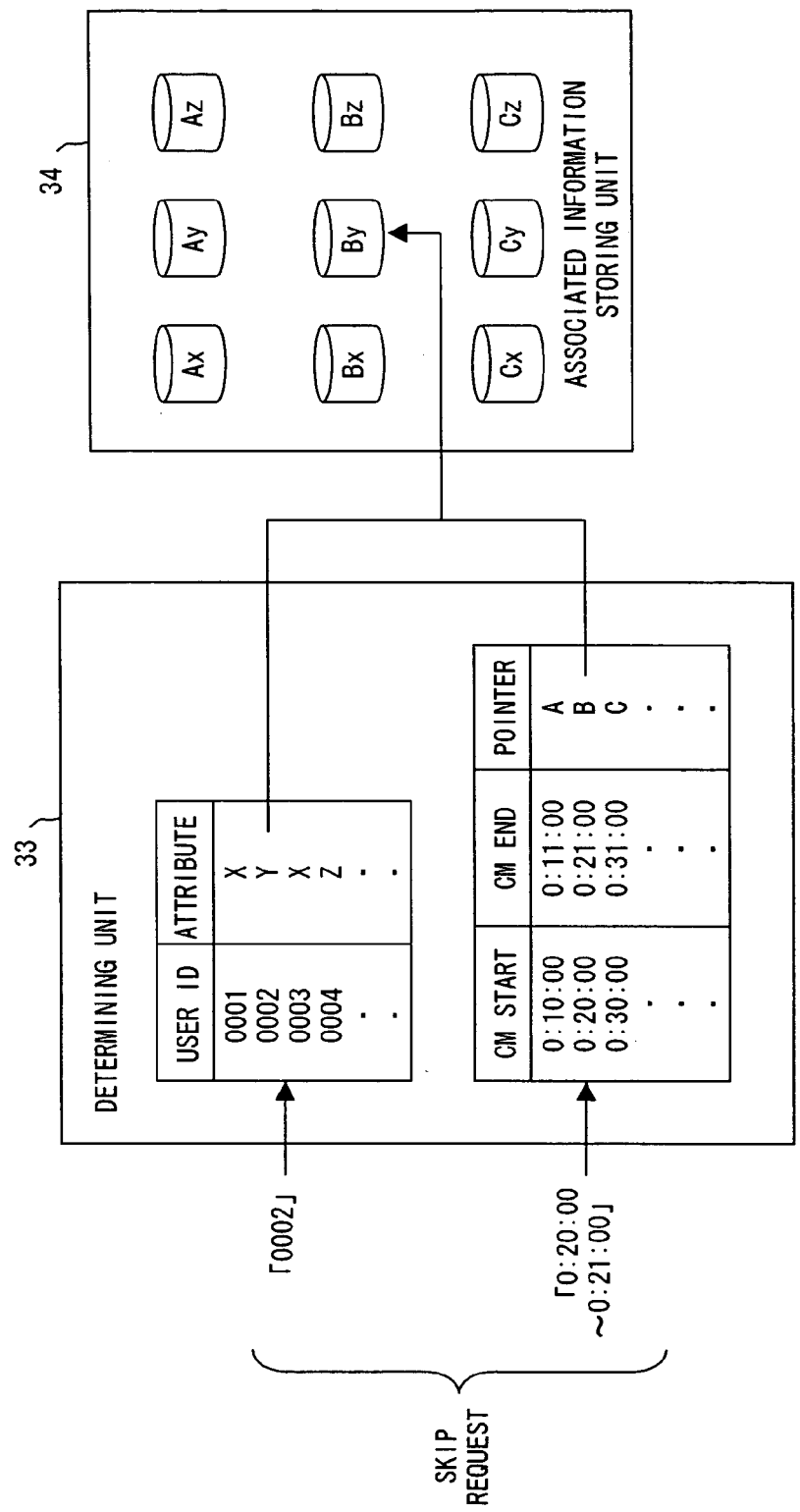
F I G. 13

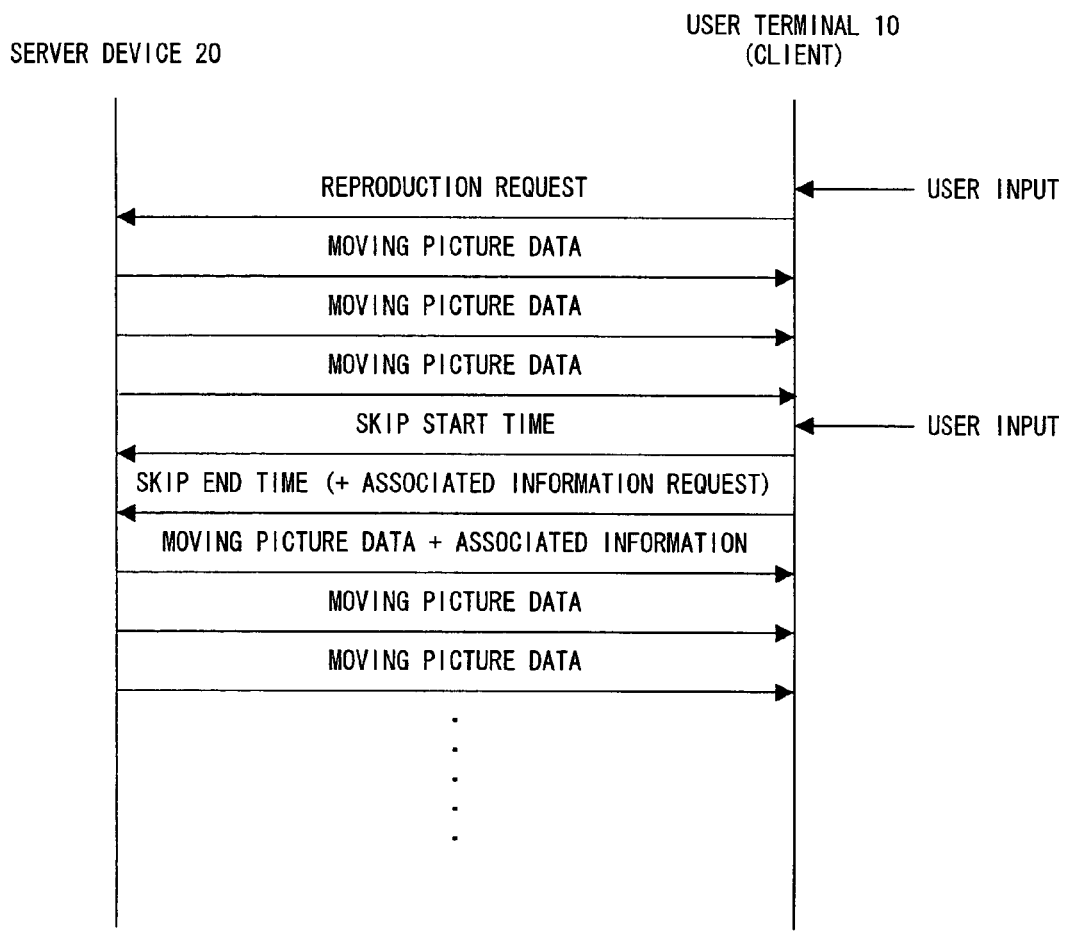
F I G. 1 6

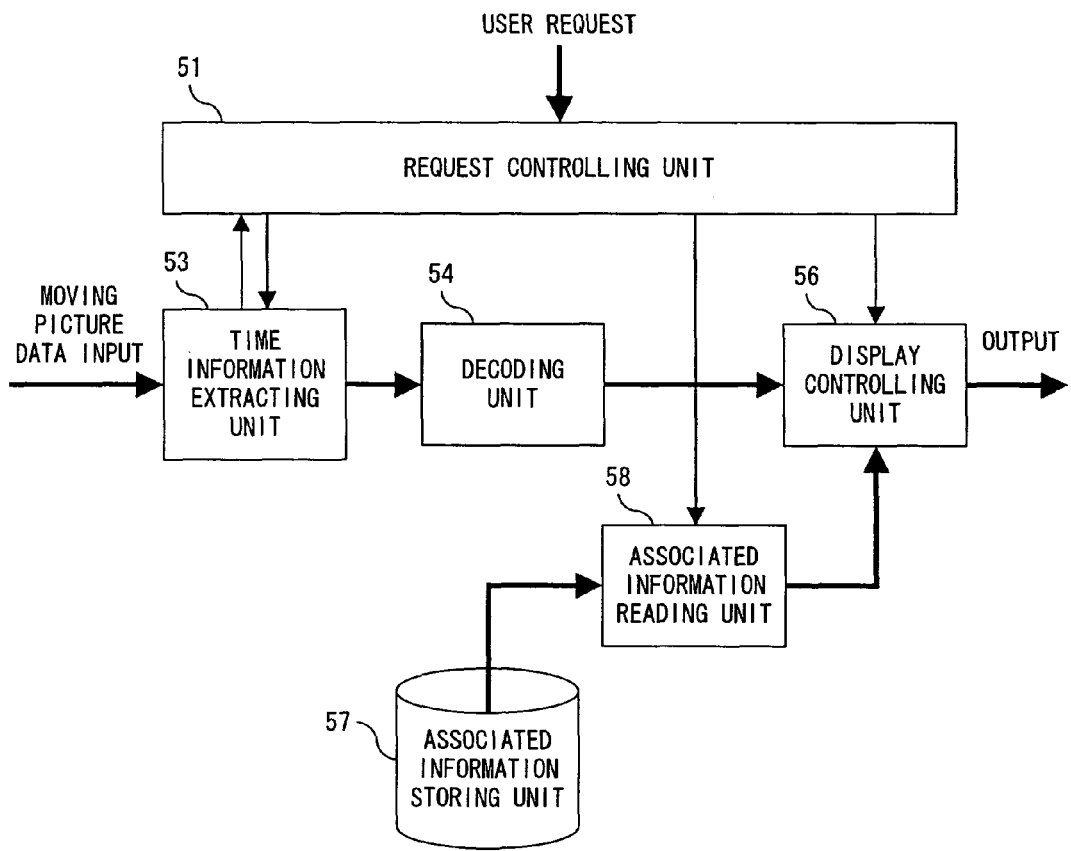
F I G. 17

VIDEO PICTURE INFORMATION DELIVERING APPARATUS AND RECEIVING APPARATUS

CROSS REFERENCE

This application is a continuation of an International application No. PCT/JP02/02477, which was filed on Mar. 15, 2002.

BACKGROUND OF THE INVENTION

1. Field of the Invention

The present invention relates to a system delivering video picture information, and more particularly, to a delivering apparatus delivering video picture information according to a request from a user, a receiving apparatus receiving video picture information delivered from a server device, and a storing device receiving and storing video picture information.

2. Description of the Related Art

In recent years, a video picture information delivering system delivering video contents according to a request of a user from a server device, which stores video picture information, via a network has started to widespread. Such a system is generally called a VOD (Video on Demand) system.

In the above described video picture delivering system, a terminal device which receives and displays video picture information normally comprises a function for making a request to make special reproduction (skip, fast-forward playback, pause, etc. of moving pictures) in addition to a function for making a request to deliver moving pictures to the server device. In the meantime, the server device reads from the storing device video contents corresponding to the request from the user, and delivers the read contents to the terminal device of the user as shown in FIG. 1. Here, this server device comprises a function for skipping a moving picture, or for halting the delivery of moving pictures according to a request of a user.

Incidentally, a video picture desired to be securely viewed by a user is often inserted in video picture information delivered by the above described system. For example, a video picture of an advertisement of a sponsor of the video picture information is inserted in the delivered video picture information. However, a user often skips the video picture of the advertisement by using the above described special reproduction function when reproducing the received video picture information. Here, if the video picture of the advertisement is not viewed by the user, it is expected that the sponsor will not offer funds for producing video contents in the current business model. Namely, good-quality programs can possibly decrease.

For this reason, various methods are proposed to avoid such a situation. For example, a configuration having a function for prohibiting the skip of a video picture portion of an advertisement, a configuration for charging an extra fee when the video picture portion of the advertisement is skipped, and the like are proposed.

However, there is a possibility that these methods are not user-friendly, or not accepted by users.

This problem can occur not only in a video picture information delivering system such as a VOD system, etc. but also in a case where video picture information received by a normal TV tuner, etc. is stored onto a storage medium, and the stored video picture information is reproduced.

SUMMARY OF THE INVENTION

An object of the present invention is to provide a method for securely making a user view particular information (especially, advertisement information), which is included in delivered video contents, in a system where video picture information is delivered.

A video picture information delivering apparatus according to the present invention delivers moving pictures according to a request from a terminal device. This apparatus comprises: a determining unit for determining whether or not a predetermined particular picture is included in some of moving pictures to be skipped, upon receipt of a request to skip the some of the moving pictures; and a transmitting unit for transmitting associated information corresponding to the particular picture along with the moving pictures after being skipped if the particular picture is included in the some of the moving pictures to be skipped.

If this video picture delivering apparatus is used in the video picture delivering system, and the particular picture is skipped, associated information corresponding to the particular picture is transmitted to the terminal device. Accordingly, even if the particular picture is skipped, the associated information corresponding to the particular picture is displayed on the terminal device. Namely, it is possible to make a user securely view the information associated with the particular picture.

This video picture information delivering apparatus may be configured to further comprise a storing unit for storing the associated information, and a combining unit for combining the moving pictures after being skipped and the associated information stored in the storing unit. In this case, the transmitting unit transmits the pictures combined by the combining unit to the terminal device. With this configuration, the moving pictures after being skipped, in which the associated information is embedded, can be displayed on the terminal device.

Or, this video picture information delivering apparatus may be configured to further comprise a storing unit for storing the above described associated information, wherein the transmitting unit may multiplex the moving pictures after being skipped and the associated information, and transmit the multiplexed pictures to the terminal device. In this case, the moving pictures after being skipped and the associated information are combined and displayed by the terminal device.

A video picture information receiving apparatus according to the present invention is used to receive moving pictures from a server device in a system where the moving pictures are delivered from the server device according to a request from a user. This apparatus comprises: a requesting unit for transmitting a request to skip some of the moving pictures to the server device; an obtaining unit for obtaining associated information corresponding to a predetermined particular picture if the particular picture is included in the some of the moving pictures to be skipped; and a displaying unit for making the display device display the moving pictures after being skipped and the associated information.

With this video picture information receiving apparatus, associated information corresponding to a particular picture is received from the server device, etc. if the particular picture is skipped. Accordingly, the associated information corresponding to the particular picture can be displayed on the display device even if the particular picture is skipped. Namely, it is possible to make a user securely view the information associated with the particular picture.

BRIEF DESCRIPTION OF DRAWINGS

FIG. 1 is a schematic showing basic functions of a server device;

FIG. 3 is a schematic showing the structure of video data of MPEG;

FIG. 4 is a schematic showing the structure of audio data of MPEG;

FIG. 5 is a schematic showing the structure of a pack when video data and audio data are stored;

FIG. 6 is a schematic showing a configuration of a server device according to a first embodiment;

FIG. 7 is a schematic diagram showing video contents stored in the server device;

FIG. 13 is a schematic showing a principle part of the server device, which transmits associated information corresponding to an attribute of a user to a user terminal;

FIG. 16 is a schematic showing a user request, and the state of data delivery according to the request;

FIG. 17 is a schematic showing a configuration of a user terminal used in a third embodiment.

DESCRIPTION OF THE PREFERRED EMBODIMENTS

Preferred embodiments according to the present invention are described hereinafter.

Figure 2:
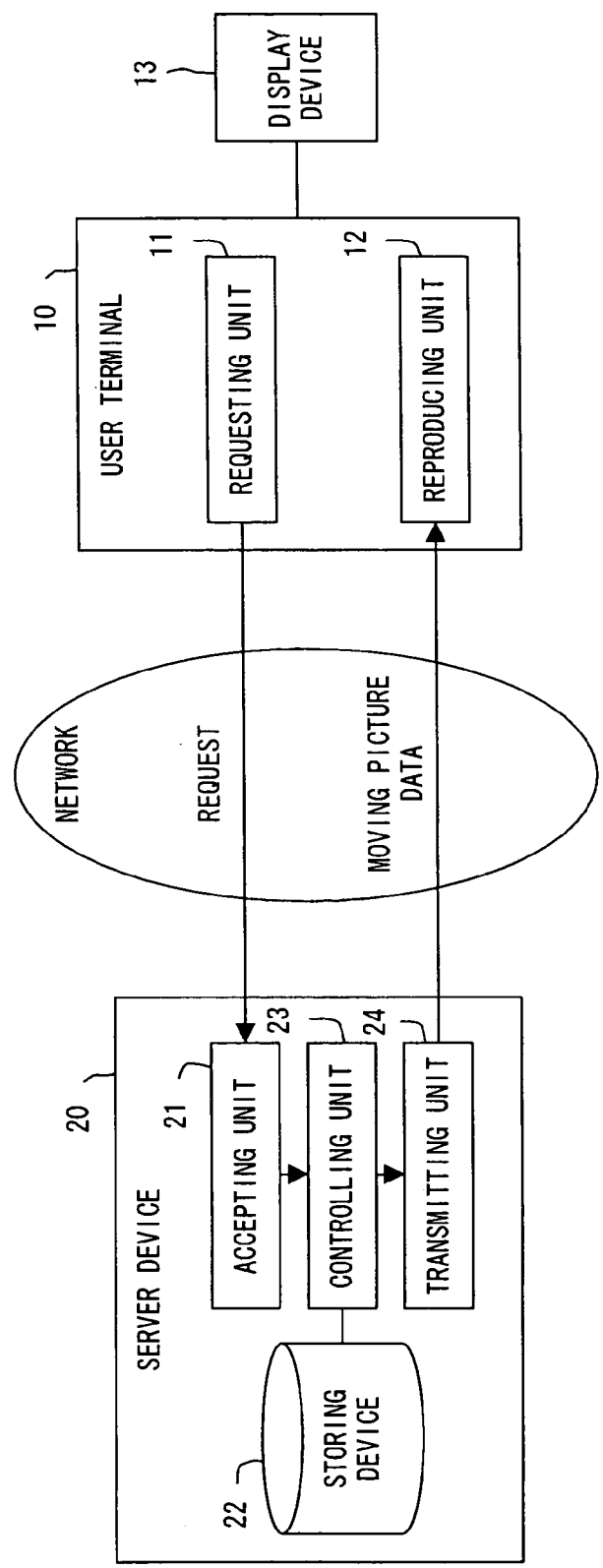
FIG. 2 is a schematic showing a configuration of a video picture information delivering system.

FIG. 2 is a schematic showing a configuration of a video picture information delivering system. In this system, a user terminal 10 is connected to a server device 20 via a network, and makes a request to deliver moving pictures to the server device 20. Here, the network may be a public network or a private network. Additionally, part or the whole of the network may be a wireless network. Furthermore, communications protocols are not particularly limited. In the meantime, the server device 20 delivers the moving pictures according to the request from the user terminal 10.

The user terminal 10 comprises a requesting unit 11 transmitting a request from a user to the server device 20, and a reproducing unit 12 reproducing moving picture data received from the server device 20. Here, the request from the user includes "playback", "pause", "fast-forward playback", "skip", etc. Furthermore, the user terminal 10 comprises a display device 13 displaying the moving pictures delivered from the server device 20.

The server device 20 comprises an accepting unit 21, a storing device 22, a controlling unit 23, and a transmitting unit 24. The accepting unit 22 accepts a user request transmitted from the user terminal 10. The storing device 22 stores moving picture data of video picture information to be delivered to the user terminal 10. The controlling unit 23 reads corresponding moving picture data from the storing device 22 according to the user request accepted by the accepting unit 21. The transmitting unit 24 transmits to the user terminal 10 the moving picture data that the controlling unit 23 reads from the storing device 22.

With the above described configuration, the user transmits a request to the server device 20 by using the user terminal 10, whereby he or she can receive and view desired video contents.

Moving picture data (including audio data) stored in the storing device 22 is not particularly limited. However, the moving picture data is assumed to conform, for example, to the specifications stipulated by MPEG (Moving Picture Experts Group).

FIG. 3 is a schematic showing the structure of video data of MPEG. The video data of MPEG is configured by a sequence header (SH), and a group of pictures (GOP) succeeding thereto. At its end, a sequence end code (SEC) is provided. Each of groups of pictures (GOPs) includes a plurality of pictures. Fundamentally, each of the groups of pictures (GOPs) includes an I picture (intra-frame coded picture), a P picture (inter-frame forward predictive coded picture), and a B picture (inter-frame bidirectional predictive coded picture).

Each piece of picture data is configured by a plurality of slices, each of which is configured by a plurality of macro blocks (MBs). Each of the macro blocks (MBs) is configured by a brightness signal (Y), and color difference signals (Cb, Cr). The brightness signal (Y) is configured by four 8×8 blocks, whereas each of the color difference signals (Cb,Cr) is configured by one 8×8 block.

An access to the above described video data is fundamentally made in units of groups of pictures (GOPs) Additionally, moving picture data is compressed with a discrete cosine transform (DCT), quantization, variable encoding, etc. in units of the above described 8×8 blocks.

FIG. 4 is a schematic showing the structure of audio data of MPEG. The audio data of MPEG is configured by AAUs (Audio Access Units) each of which is created for each frame. The AAU is a minimum unit that can be decoded into an audio signal, and includes data of a predetermined number of samples (384 samples). The AAU is configured by a header, an error check (EC), and audio data. Here, the error check (EC) is, for example, a 16-bit CRC. However, this is not an essential element. Additionally, the audio data is configured by an allocation, a scale factor, and samples. The allocation is bit allocation information. The scale factor indicates a magnification when the waveform of each channel is reproduced. The samples are encoded sampling data.

The above described video data is put into packets in units of pictures of GOPs, whereas the audio data is put into packets in units of AAUs. A plurality of video packets or audio packets are bound, whereby a "pack" is configured as shown in FIG. 5.

To each pack, a pack header and a system header are attached. Here, the pack header includes an SCR (System Clock Reference) which represents a reference time when moving picture data is reproduced. In the meantime, the system header includes information which indicates a bit rate, information which indicates the number of video channels/audio channels, and the like.

When video data and audio data, which have the above described configurations, are stored in the storing device 22, a table which manages a correspondence between the SCR of each pack and a storage address is created. When moving picture data is read from the storing device 22, that table is referenced.

Additionally, a time stamp which indicates reproduction timing is added to moving picture data. Specifically, for example, a PTS (Presentation Time Stamp) for managing the time of a reproduction output, and a DTS (Decoding Time Stamp) for managing the time of decoding are added for each frame of the video data.

Specific embodiments of the video picture information delivering system according to the present invention are described below.

First Embodiment

In the first embodiment, whether or not an advertisement picture is included in moving pictures to be skipped is examined when some of moving pictures are skipped according to a user request. If the advertisement picture is included in the moving pictures to be skipped, associated information corresponding to the skipped advertisement picture is displayed on a display device 13 when the moving pictures after being skipped are displayed on the display device 13 of the user terminal 10. Here, the associated information is information associated with the advertisement picture which is inserted in the moving pictures delivered to the user terminal 10. The associated information may be character data, still picture data, or moving picture data. Additionally, the associated information is fundamentally configured by character information or picture information, which is obtained by simplifying the contents of the corresponding advertisement picture. For example, associated information corresponding to an advertisement picture of a certain sweet is configured by information which indicates the name of a company making the sweet, information which indicates the name of the sweet, information which indicates the feature or the sale point of the sweet, and the like.

FIG. 6 is a schematic showing the configuration of the server device 20 in the first embodiment. The server device 20 reads moving picture data of corresponding video contents from a video contents storing device 31 according to a request from a user, and delivers the read data to the user terminal 10. Here, the video contents storing device 31 may be implemented as part of the server device 20, or a device independent of the server device 20. Additionally, the video contents storing device 31 stores moving picture data of video contents to be delivered to the user terminal 10. Here, the video contents to be delivered to the user terminal 10 are configured by main part pictures and advertisement pictures (CMs) as shown in FIG. 7. Video contents stored in the video contents storing device 31 are sometimes referred to as original video pictures or original pictures.

The request from the user includes at least information which identifies the user or the user terminal 10, and information which represents the contents of the request. Here, the server device 20 accepts at least a playback request, a pause request, a fast-forward request, and a skip request. Namely, the user terminal 10 can make the user select at least an arbitrary request of "playback", "pause", "fast-forward playback", and "skip".

The request from the user is accepted by the accepting unit 21. Then, an accepting unit 21 analyzes the received user request, and notifies a read controlling unit 32 of its result. Here, if the user makes the "playback" request, the read controlling unit 32 reads the moving picture data of the specified video contents from the video contents storing device 31. Then, a transmitting unit 24 transmits the moving picture data to the user terminal 10. As a result, the moving pictures delivered from the server device 20 are displayed on a display device 13 of the user terminal 10. For example, if the video contents shown in FIG. 7 are delivered to the user terminal 10, video pictures in which advertisement pictures are inserted are displayed on the display device 13.

Or, if the user makes the "skip" request while the moving pictures are being displayed on the display device 13, that request is accepted by the accepting unit 21. Then, the accepting unit 21 detects a skip start time and a skip end time, and notifies the read controlling unit 32 and a determining unit 33 of its results. In this case, the read controlling unit 32 reads moving picture data after the skip end time without reading moving picture data from the skip start time until the skip end time, after reading moving picture data up to the skip start time. In the meantime, the determining unit 33 examines whether or not an advertisement picture is included during the time period from the skip start time to the skip end time. Then, if the advertisement picture is included during that time period, the determining unit 33 reads associated information corresponding to the skipped advertisement picture from an associated information storing unit 34, and passes the read information to the transmitting unit 24.

Upon receipt of the associated information from the determining unit 33, the transmitting unit 24 generates a combined picture which includes the moving pictures after being skipped and the associated information, and transmits the combined pictures to the user terminal 10.

Figure 8A:
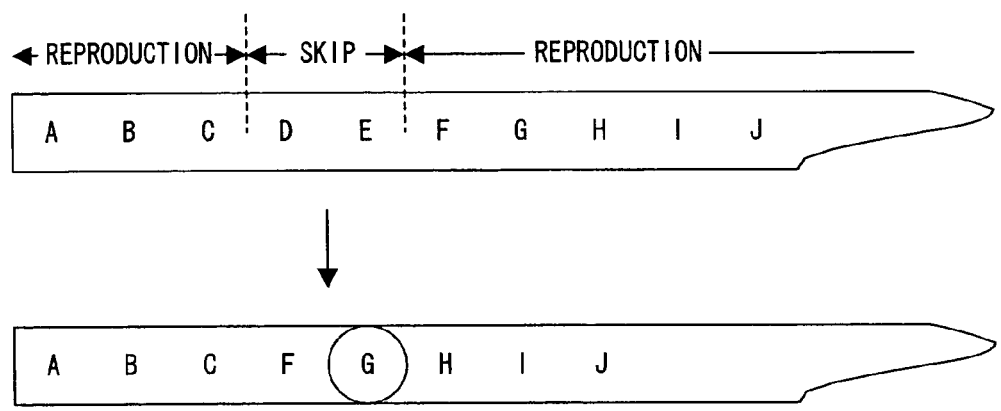
FIGS. 8A and 8B are schematic diagrams showing moving picture delivery operations when a skip request is input.
Figure 8B:
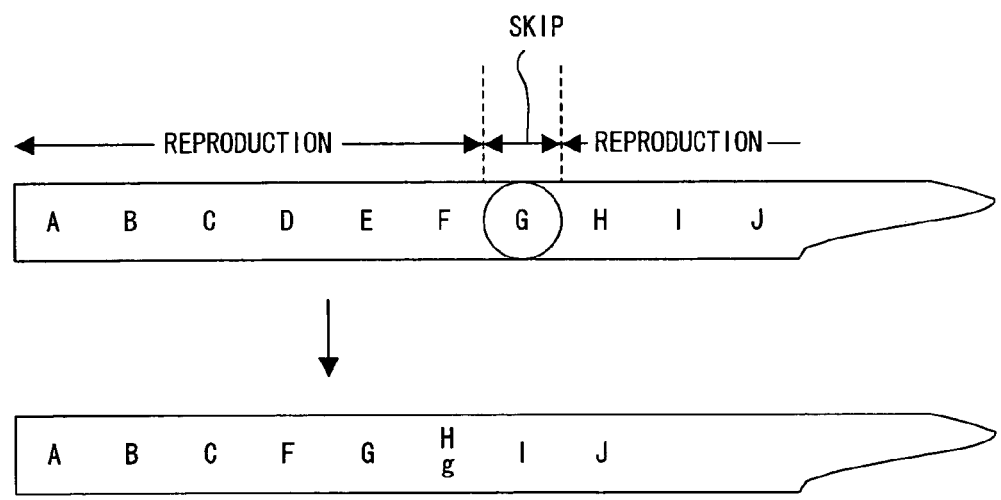

FIGS. 8A and 8B are schematic diagrams showing moving picture delivery operations when the skip request is input. Here, assume that original video pictures stored in the video contents storing device 31 are configured by a picture A, a picture B, a picture C, . . . , a picture H, a picture I, a picture J . . . . Also assume that the picture G is an advertisement picture and a moving picture for a predetermined time period (by way of example, 60 seconds).

When a request to skip the pictures D and E is input in FIG. 8A, the read controlling unit 32 skips the pictures D and E and reads the pictures G through J after reading the pictures A through C. Since the advertisement picture is not included in the moving pictures specified by the skip request at this time, the determining unit 33 notifies the transmitting unit 24 that the advertisement picture is not included. Then, the transmitting unit 24 transmits the pictures A through C and G through J, which are read by the read controlling unit 32, to the user terminal 10. Accordingly, the pictures G through J are displayed in succession to the pictures A through C on the display device 13 of the user terminal 10 in this case.

In the meantime, when a request to skip the picture G is input in FIG. 8B, the read controlling unit 32 skips the picture G and reads the pictures H through J after reading the pictures A through F. Since the advertisement picture is included in the moving picture specified by the skip request, the determining unit 33 reads associated information g, which corresponds to the picture G, from the associated information storing unit 34, and passes the read information to the transmitting unit 24.

Upon receipt of the associated information g, the transmitting unit 24 combines an original picture and the associated information g at predetermined timing after the skip. In the example shown in FIG. 8B, the associated information g is combined with the original picture immediately after the picture skip is terminated. Namely, the combined picture configured by the picture H and the associated information g is generated. Accordingly, in this case, when the moving pictures are displayed on the display device 13, the combined picture which includes the picture H and the associated information g is displayed at timing when the picture H is to be displayed.

As described above, in the video picture information delivering system according to the first embodiment, if an advertisement picture is skipped by a user, information associated with the advertisement picture is displayed on the user terminal along with the pictures after being skipped. Accordingly, a provider (or a sponsor) of the pictures can make a user securely view information associated with the advertisement picture, even if the advertisement picture is skipped. In the meantime, the user can skip the moving picture at desired timing without paying any extra cost.

Note that the skip request is input by the user, for example, with the use of a skip button comprised by the user terminal 10. If the user desires to skip some of the moving pictures in this case, he or she presses (or clicks) the skip button. Additionally, a "time period during which a moving picture is skipped" is specified, for example, by a time during which the skip button continues to be pressed, or by the number of times that the skip button is repeatedly pressed. Or, the "time period during which a moving picture is skipped" may be directly specified by using a keyboard, etc.

When the skip request is input from the user, the user terminal 10 calculates the "skip start time" and the "skip end time". Here, the "skip start time" is, for example, a time at which the skip button is pressed by the user. In the meantime, the "skip end time" is a time elapsed from the "skip start time" for the "time period during which a moving picture is skipped". These times are measured by using the beginning of the moving pictures displayed on the display device 13 as a reference. Or, these times may be obtained, for example, by using the above described SCR, PTS, DTS, etc. Then, the user terminal 10 transmits the "skip start time" and the "skip end time" to the server device 20 as the skip request. As a result, the server device 20 can recognize a time domain during which the moving picture is to be skipped. Note that the "skip start time" and the "skip end time" may be calculated by the server device 20.

Figure 9:
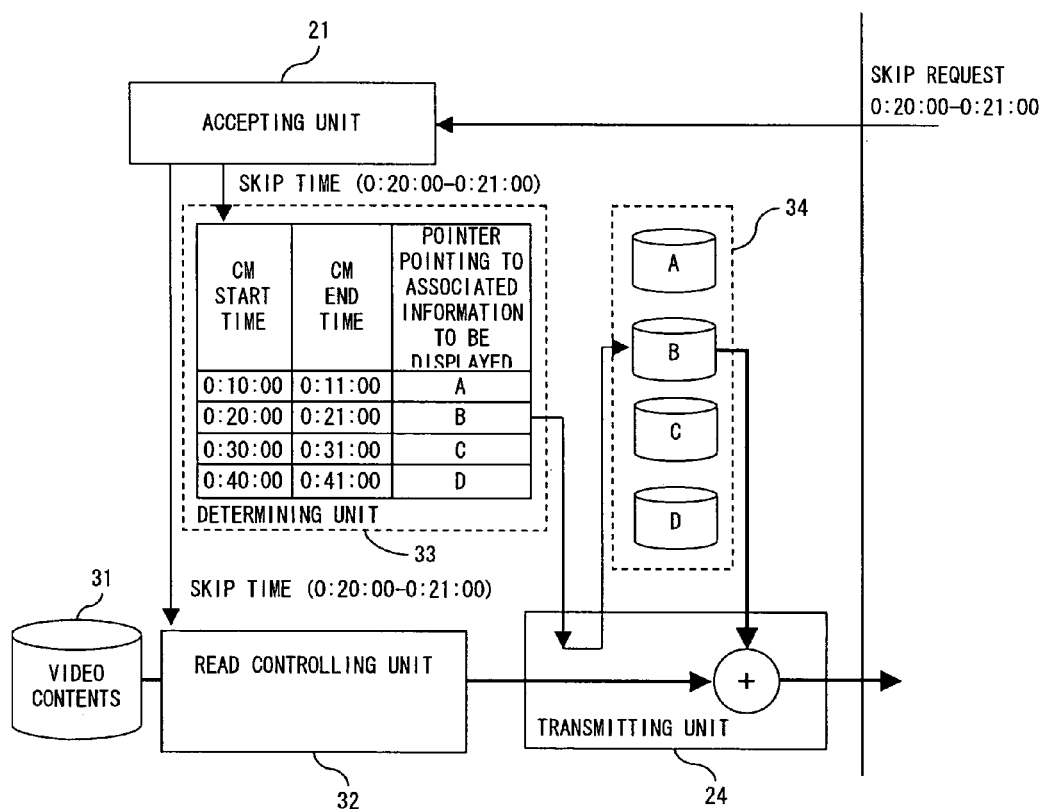
FIG. 9 is a schematic explaining the operations of the server device.

FIG. 9 is a schematic explaining the operations of the server device 20. In FIG. 9, the determining unit 33 comprises a table for managing advertisement pictures inserted in original video pictures. Here, to this table, appearance times (the start time and the end time) of each of advertisement pictures, and a pointer pointing to a location where associated information is stored are registered. In the associated information storing unit 34, associated information corresponding to each of the advertisement pictures is stored. The storage addresses of the associated information are registered to the above described table.

In the implementation example shown in FIG. 9, the server device 20 receives the skip request from the user terminal 10 while the moving pictures are being delivered from the server device 20 to the user terminal 10. Here, assume that this skip request specifies "skip start time=0:20:00, skip end time=0:21:00".

The above described skip request is accepted and analyzed by the accepting unit 21. Then, the accepting unit 21 generates skip time information, and notifies the read controlling unit 34 and the determining unit 33 of the generated skip time information. Here, the skip time information is configured by the "skip start time", and the "skip end time".

When the skip time information is provided, the read controlling unit 32 reads moving picture data from the video contents storing device 31 according to the information. Namely, the read controlling unit 32 skips the domain corresponding to "0:20:00 to 0:21:00" when reading the moving picture data from the video contents storing device 31.

In the meantime, the determining unit 33 examines whether or not an advertisement picture is included in the moving pictures skipped by the user by referencing the above described table. In this example, an advertisement picture, which is registered to the second record in the table shown in FIG. 9, is included in the moving pictures skipped by the user. Accordingly, a pointer B corresponding to the advertisement picture is obtained in this case. Then, the determining unit 33 extracts corresponding associated information from the associated information storing unit 34 by using the pointer B, and passes the extracted information to the transmitting unit 24.

The transmitting unit 24 transmits the moving pictures read by the read controlling unit 32 to the user terminal 10, and also transmits the associated information to the user terminal 10 if the associated information is provided from the determining unit 33. Operations of the transmitting unit 24 are described below with reference to FIG. 10.

The transmitting unit 24 first decodes the moving picture data after being skipped, which is read by the read controlling unit 32. As a result, respective frames of the moving pictures after being skipped are generated. That is, for example, bit-map data of the respective frames configuring the moving pictures after being skipped is generated. At this time, the transmitting unit 24 decodes only the moving picture data of the time period corresponding to the display time of the associated information provided from the determining unit 33. For example, if the time during which the associated information is to be displayed is 30 seconds, the transmitting unit 24 decodes the moving picture data for 30 seconds.

Then, the transmitting unit 24 reduces the pictures of the respective frames configuring the reproduced moving pictures. Here, a process for reducing a picture can be implemented with a known technique. Then, a combined picture that is configured by a reduced picture and associated information is generated. At this time, the associated information is arranged in a marginal region obtained by reducing an original picture. Hereafter, the transmitting unit 24 encodes the combined picture that is configured by the original picture and the associated information, and transmits the encoded picture data to the user terminal 10.

Figure 11A:
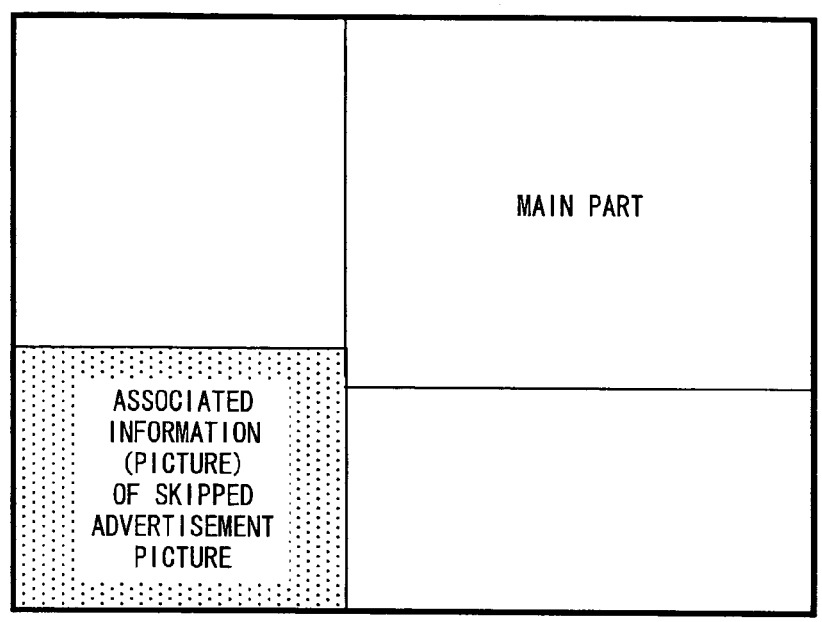
FIGS. 11A and 11B respectively show an example of an arrangement of a main part picture and associated information.
Figure 11B:
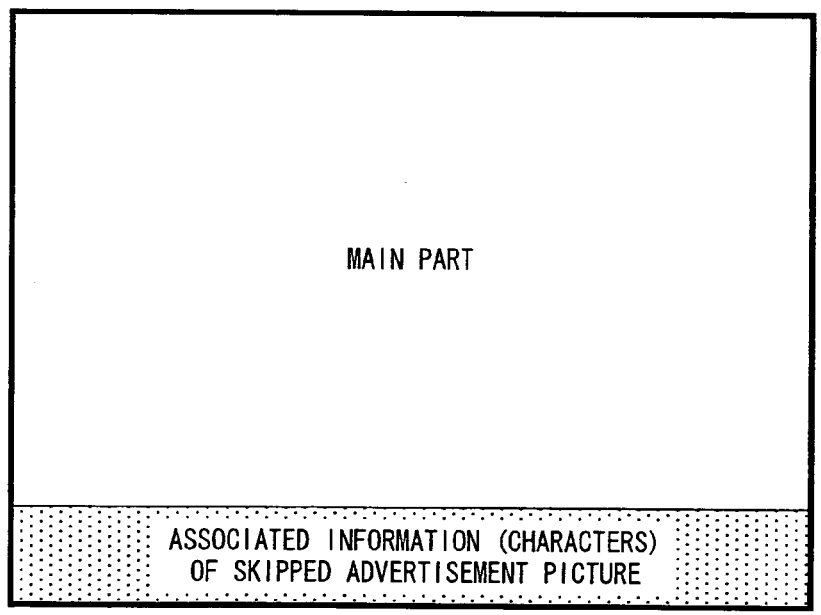

The arrangement of the original picture and the associated information is not particularly limited. However, for example, a layout is made so that the associated information is arranged at a top end, a bottom end, a right end, or a left end of a frame or in any of its corners. For instance, an example shown in FIG. 11A depicts a case where associated information (picture information) is arranged in a lower left region of a frame. In the meantime, an example shown in FIG. 11B depicts a case where associated information (character information) is arranged in a bottom end region of a frame.

In the above described implementation examples, the associated information is arranged in the marginal region obtained by reducing the original picture. However, the present invention is not limited to this implementation. Namely, associated information may be displayed, for example, to overwrite an original picture without reducing the original picture.

Figure 10:
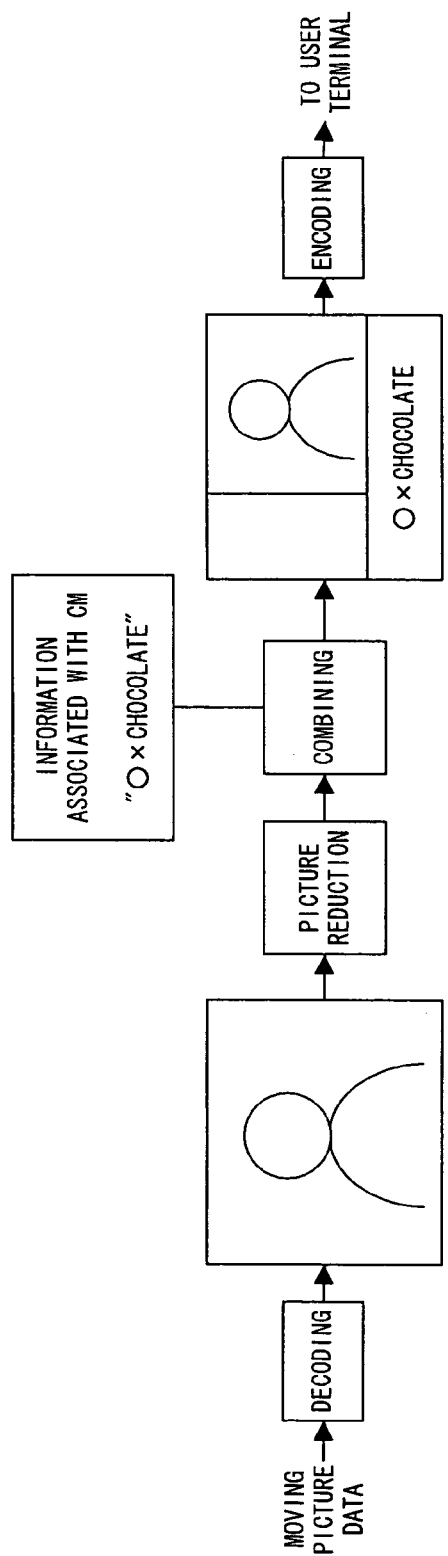
FIG. 10 shows one example of the operations of a transmitting unit provided in the server device.
Figure 12:
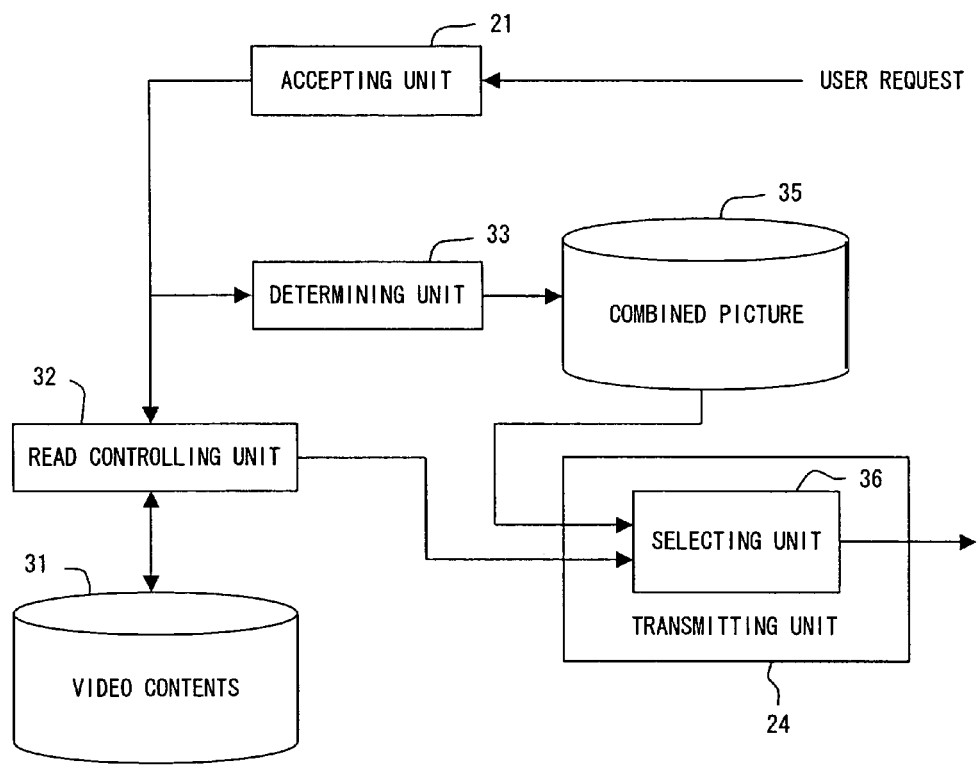
FIG. 12 is a schematic showing a modification example of the server device according to the first embodiment.

Additionally, in the example shown in FIG. 10, the original picture and the associated information are combined in the server device 20 when the advertisement picture is skipped. However, moving picture data of a combined picture which includes the original picture and the associated information may be prepared in advance. In this case, a combined picture storing unit 35 is provided as a replacement for the associated information storing unit 34 as shown in FIG. 12. Here, in the combined picture storing unit 35, for example, moving picture data of a combined picture which is configured by an original picture and associated information is stored. Additionally, the transmitting unit 24 comprises a selecting unit 36 selecting either moving picture data read by the read controlling unit 32 or moving picture data read from the combined picture storing unit 35. Here, the selecting unit 36 selects one of the moving picture data according to an instruction from the determining unit 33. Namely, the selecting unit 36 selects and outputs the moving picture data read by the read controlling unit 32 in normal times, however selects and outputs the moving picture data read from the combined picture storing unit 35 when an advertisement picture is skipped.

With this configuration, it is possible to make a user view associated information corresponding to a skipped advertisement picture without executing the series of processes shown in FIG. 10 (the process for reproducing an original picture, the process for reducing the reproduced original picture, the process for combining the reduced original picture and associated information, and the process for encoding the generated combined picture), when the advertisement picture is skipped. Namely, the load imposed on the server device 20 is lightened.

In the meantime, associated information transmitted to the user terminal 10 when an advertisement picture is skipped is allowed to vary by user. Namely, a plurality of items of associated information are prepared for each advertisement picture, and a suitable item of associated information may be selected according to an attribute of a user (such as the age, the gender, the family structure, etc. of the user), and transmitted to the user terminal 10.

FIG. 13 is a schematic showing a configuration for transmitting a suitable item of associated information for each user. In FIG. 13, the determining unit 33 comprises a table for storing a correspondence between the ID of each user and his or her attribute. Here, the attribute of each user is assumed to be registered in advance. Furthermore, a plurality of items of associated information are stored in the associated information storing unit 34 for each advertisement picture.

In the above described configuration, the skip request includes a user ID and skip time information. In the example shown in FIG. 13, a pointer B is obtained based on the skip time information, and an attribute y is obtained based on the user ID. In this case, the determining unit 33 extracts associated information By from the associated information storing unit 34. Then, the associated information thus extracted is transmitted to the user terminal 10.

Accordingly, if the configuration shown in FIG. 13 is introduced, effective associated information can be transmitted to a user who views video contents, whereby an advertisement effect is improved.

As described above, in the video picture information delivering system according to the first embodiment, combined pictures, which are obtained by embedding associated information corresponding to a skipped advertisement picture in moving pictures after being skipped, are generated by the server device 20. Then, the combined pictures are delivered to the user terminal 10. Accordingly, the user terminal 10 decodes the received data, whereby moving pictures including the associated information can be reproduced. Namely, the user terminal 10 does not need to be provided with a special function for displaying associated information.

Second Embodiment

As described above, in the first embodiment, combined pictures configured by original pictures after being skipped and associated information are generated by the server device 20, and the combined pictures are transmitted to the user terminal 20. In the meantime, in the second embodiment, associated information corresponding to a skipped advertisement picture is transmitted to the user terminal 10 separately from original pictures. Then, the original pictures and the associated information are combined by the user terminal 10, and displayed on the display device 13.

A configuration of a server device used in a video picture information delivering system in the second embodiment is fundamentally the same as that of the server device used in the first embodiment. That is, also the server device in the second embodiment comprises the accepting unit 21, the read controlling unit 32, the determining unit 33, and the associated information storing unit 34, which are shown in FIG. 6. When an advertisement picture is skipped, associated information corresponding to the advertisement picture is extracted from the associated information storing unit 34. However, a transmitting unit comprised by the server device 20 in the second embodiment is different from that in the above described first embodiment.

Figure 14:
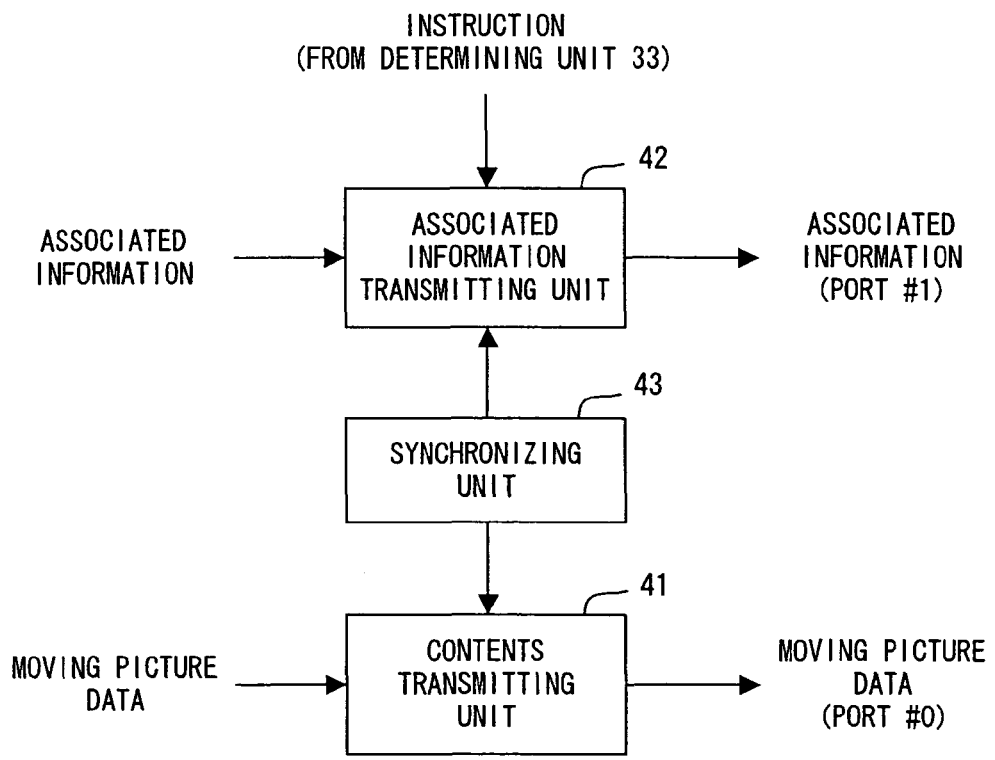
FIG. 14 is a schematic showing a configuration of a transmitting unit of a server device used in a second embodiment.

The transmitting unit of the server device in the second embodiment comprises a contents transmitting unit 41, an associated information transmitting unit 42, and a synchronizing unit 43 as shown in FIG. 14. Here, the contents transmitting unit 41 transmits moving picture data read by the read controlling unit 32 to the user terminal 10 by using a predetermined port (#0). In the meantime, the associated information transmitting unit 42 transmits associated information to the user terminal 10 by using a predetermined port (#1) when the associated information is provided from the determining unit 33. The moving picture data and the associated information are multiplexed with channel multiplexing, and transmitted to the user terminal 10. These ports are specified, for example, with port numbers of TCP/IP. Additionally, synchronization between the moving picture data and the associated information is established by the synchronizing unit 43.

Note that the moving picture data and the associated information may be multiplexed with another method. Namely, the moving picture data and the associated information may be multiplexed, for example, with time-division multiplexing.

If an advertisement picture inserted in delivered video contents is skipped as described above, associated information corresponding to the advertisement picture is transmitted from the server device 20 to the user terminal 10. However, in the second embodiment, original pictures and associated information are not combined by the server device 20, and moving picture data and the associated information are multiplexed and transmitted to the user terminal 10. Accordingly, the user terminal 10 must comprise a function for extracting associated information from received data, and for displaying the extracted information on the display device 13.

Figure 15:
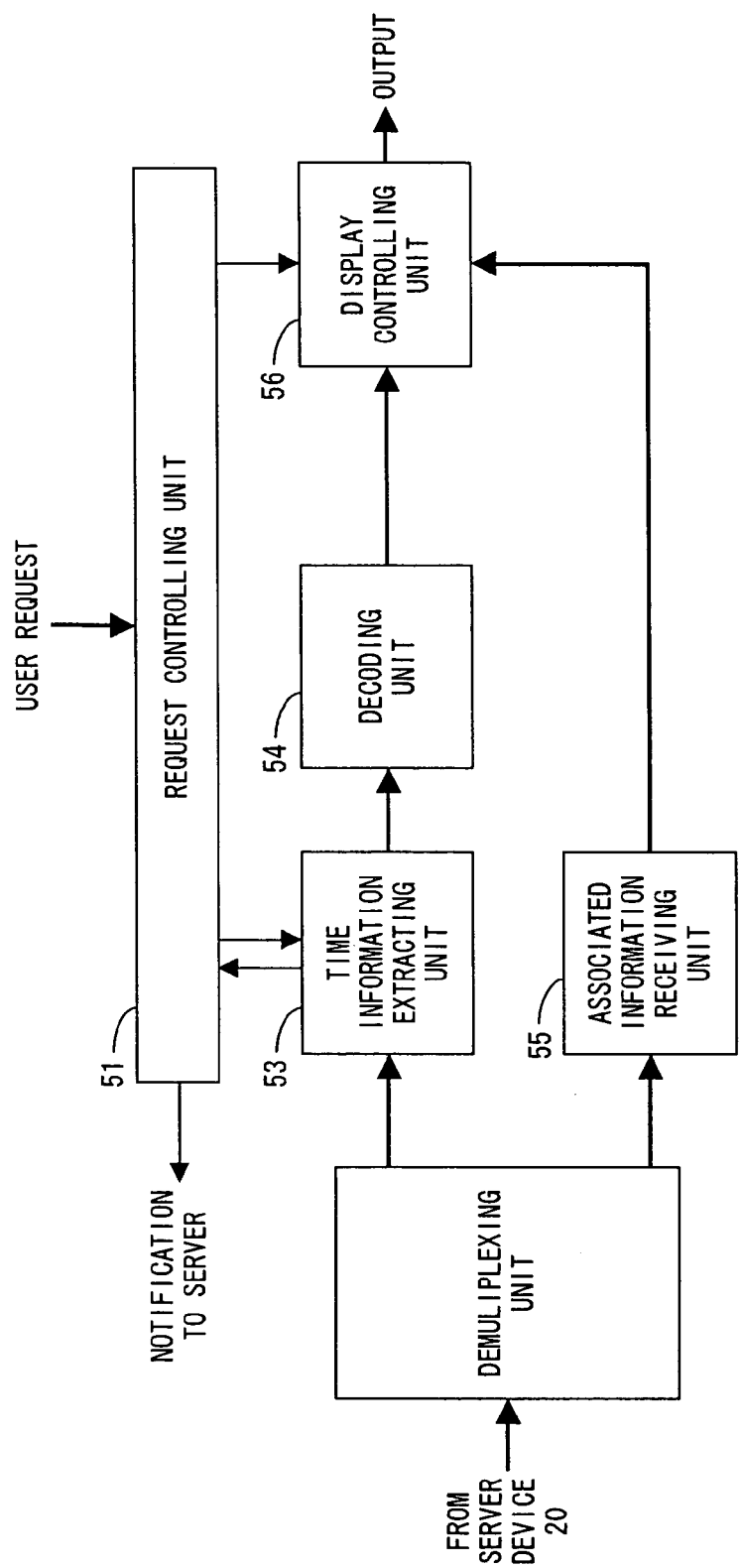
FIG. 15 is a schematic showing a configuration of a user terminal used in the second embodiment.

FIG. 15 is a schematic showing a configuration of the user terminal 10 used in the second embodiment. The user terminal 10 in the second embodiment comprises a request controlling unit 51, a demultiplexing unit 52, a time information extracting unit 53, a decoding unit 54, an associated information receiving unit 55, and a display controlling unit 56. The user terminal 10 comprises, as basic functions, a function for making a request to deliver video picture information to the server device 20, a function for receiving moving picture data from the server device 20, a function for reproducing moving pictures from the received moving picture data and for displaying the reproduced moving pictures on the display device 13, and a function for transmitting a user request to the server device 20. Also the user terminal in the first embodiment comprises these basic functions.

The request controlling unit 51 analyzes a user input, and creates a user request. Here, the user input means that, for example, a playback button, a pause button, a fast-forward button, a skip button, a key input button, etc. is operated by a user. The request controlling unit 51 transmits the created user request to the server device 20. If an advertisement picture is skipped by the user request at this time, the server device 20 transmits associated information corresponding to the skipped advertisement picture to the user terminal 10.

FIG. 16 shows the user request and data delivery according to the user request. The user terminal 10 transmits the playback request to the server device 20 according to an instruction from a user. Upon receipt of the playback request, the server device 20 starts to transmit moving picture data specified by the playback request. If the skip request is provided from the user while the moving picture data is being delivered, the user terminal 10 notifies the server device 20 of the skip start time and the skip end time. If an advertisement picture is skipped at this time, the server device 20 transmits associated information corresponding to the skipped advertisement picture to the user terminal 10 along with the moving picture data after being skipped.

Note that the data stream of the moving pictures delivered from the server device 20 to the user terminal 10 is assumed to be configured by encoded video data and encoded audio data. Furthermore, time information is added to this data stream of the moving pictures.

The demultiplexing unit 52 extracts moving picture data and associated information from received data. Specifically, if the moving picture data and the associated information are respectively transmitted by using predetermined ports, the demultiplexing unit 52 transmits the received data via a port allocated to picture data to the decoding unit 54, and also transmits the received data via a port allocated to associated information to the associated information receiving unit 55. Or, if the moving picture data and the associated information are multiplexed with time-division multiplexing and transmitted, the demultiplexing unit 52 transmits data, which is extracted from a time slot allocated to picture data, to the decoding unit 54, and also transmits data, which is extracted from a time slot allocated to associated information, to the associated information receiving unit 55. These processes can be implemented with a known technique.

The time information extracting unit 53 extracts time information added to received moving picture data, and transmits the extracted time information to the request controlling unit 51. The decoding unit 54 reproduces moving pictures by decoding received moving picture data. Then, the reproduced moving pictures are transmitted to the display controlling unit 56. In the meantime, the associated information receiving unit 55 receives associated information if the received data includes the associated information.

The display controlling unit 56 creates a picture to be displayed on the display device 13 according to an instruction from the request controlling unit 51. If the associated information receiving unit 55 does not receive associated information from the server device 20, the display controlling unit 56 displays the moving pictures reproduced by the decoding unit 54 on the display device 13. Or, if the associated information receiving unit 55 receives associated information from the server device 20, the display controlling unit 56 combines the moving pictures reproduced by the decoding unit 54 and the associated information according to timing instructed by the request controlling unit 51, and displays the combined pictures on the display device 13.

The picture combining process executed by the display controlling unit 56 is fundamentally the same as that in the server device 20 which is described with reference to FIG. 10. Namely, the picture combining process executed by the display controlling unit 56 is configured by a process for reducing each of frames configuring moving pictures reproduced by the decoding unit 54, and a process for arranging associated information in a marginal region obtained by reducing a moving picture.

As described above, if an advertisement picture is skipped in the video picture information delivering system in the second embodiment, associated information corresponding to the skipped advertisement picture is transmitted from the server device 20 to the user terminal 10. Then, the associated information is embedded in the moving pictures after being skipped, and the they are displayed by the user terminal 10. Accordingly, there is no need to execute the picture combining process in the server device 20, thereby lightening the load imposed on the server device 20.

Third Embodiment

As described above, in the first and the second embodiments, associated information corresponding to an advertisement picture is transmitted from the server device 20 to the user terminal 10 when the advertisement picture is skipped. In the meantime, in the third embodiment, associated information corresponding to an advertisement picture is prepared in a user terminal 10. If the advertisement picture is skipped, the associated information held within the user terminal is extracted and displayed on the display device 13.

FIG. 17 is a schematic showing a configuration of the user terminal 10 used in the third embodiment. In FIG. 17, the request controlling unit 51, the time information extracting unit 53, the decoding unit 54, and the display controlling unit 56 are fundamentally the same as those described with reference to FIG. 15. Note that, however, the request controlling unit 51 in the third embodiment transmits a user request not only to the server device 20 but also to an associated information reading unit 58 when the skip request is input from a user. Additionally, in a video picture information delivering system in the third embodiment, if the skip request is transmitted to the server device 20 as a user request, the server device 20 does not transmit associated information corresponding to an advertisement picture to the user terminal 10 even if the advertisement picture is skipped by the user request.

The associated information storing unit 57 stores associated information corresponding to an advertisement picture included in moving pictures delivered from the server device 20. Here, the associated information is received, for example, collectively from the server device 20 before the delivery of the moving pictures is started. Namely, if a request to deliver desired video contents is made from the user terminal 10 to the server device 20, the server device 20 transmits to the user terminal 10 associated information corresponding to an advertisement picture, which is inserted in the specified video contents, and starts to deliver the moving picture data of the specified video contents thereafter.

The associated information reading unit 58 fundamentally comprises the same function as that of the determining unit 33, which is shown in FIGS. 6 and 9. Namely, the associated information reading unit 58 comprises a table for managing information which indicates a time when each advertisement picture is inserted, and a pointer pointing to a location where associated information corresponding to each advertisement picture is stored, similar to the determining unit 33 shown in FIG. 9. The "information which indicates a time when each advertisement picture is inserted" is obtained, for example, from the server device 20. Additionally, the "pointer pointing to a location where associated information is stored" is registered when the associated information received from the server device 20 is written to the associated information storing unit 57.

Upon receipt of the skip request from the request controlling unit 51, the associated information reading unit 58 references the above described table, and determines whether or not an advertisement picture is skipped by a user. If the advertisement picture is skipped, the associated information reading unit 58 extracts corresponding associated information from the associated information storing unit 57, and passes the extracted information to the display controlling unit 56.

The display controlling unit 56 displays moving pictures reproduced by the decoding unit 54 on the display device 13 in normal times. Additionally, if an advertisement picture is skipped, the display controlling unit 56 generates combined pictures which include the moving pictures reproduced by the decoding unit, and the associated information extracted from the associated information storing unit 57, and displays the combined pictures on the display device 13.

As described above, in the video picture information delivering system in the third embodiment, associated information displayed when an advertisement picture is skipped is pre-stored in advance in the user terminal 10. Therefore, the associated information is not transmitted while moving picture data is being delivered. Accordingly, the process related to the skip request can be made faster.

Fourth Embodiment

As described above, in the first through the third embodiments, associated information corresponding to an advertisement picture is displayed on the display device 13 if the advertisement picture is skipped. In the meantime, in the fourth embodiment, if an advertisement picture is skipped, also the advertisement picture is together displayed when moving pictures after being skipped are displayed.

Specifically, upon receipt of the skip request, the server device 20 determines whether or not an advertisement picture is included in the moving pictures to be skipped. If the advertisement picture is included in the moving pictures to be skipped at this time, that advertisement picture is read from the video contents storing device 31 and held. Then, the moving pictures after being skipped are combined with the advertisement picture, and the combined pictures are transmitted to the user terminal 10. Here, this picture combining process is configured by a process for reducing the moving pictures after being skipped, a process for reducing an advertisement picture, and a process for combining these reduced pictures to be suitably arranged. The moving pictures after being skipped and the advertisement picture are arranged, for example, as the layout shown in FIG. 11A.

<Apparatus Receiving and Storing Video Picture Information>

As described above, in the video picture information delivering systems according to the first through the fourth embodiments, moving pictures are delivered from the server device 20 to the user terminal 10 according to a request from a user. In contrast, an apparatus recording TV video pictures, etc., which are broadcast from a broadcasting station, is described below.

Figure 18:
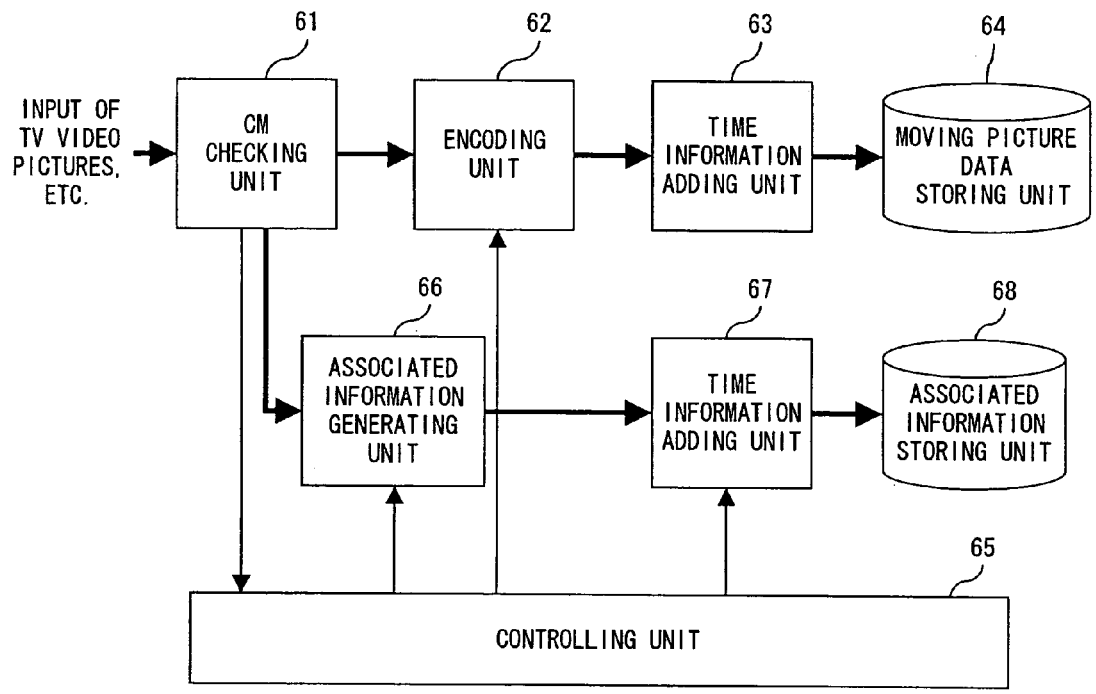
FIG. 18 is a schematic showing a configuration of a storing device receiving and storing moving picture data.

FIG. 18 is a schematic showing a configuration of a storing device receiving and storing moving picture data. The moving picture data received by this device may be transmitted by using a wireless signal or via a cable. Additionally, the transmitted moving picture data is assumed to be configured by main part pictures and advertisement pictures as shown in FIG. 7.

A CM checking unit 61 detects an advertisement picture from received moving picture data. A function for detecting an advertisement picture by identifying a main part picture and the advertisement picture, which are included in moving picture data, can be implemented with a known technique. An encoding unit 62 encodes received moving picture data with a predetermined encoding method. A time information adding unit 63 adds time information to the moving picture data encoded by the encoding unit 62. Then, the moving picture data is stored in a moving picture data storing unit 64.

A controlling unit 65 detects the start time and the end time of the advertisement picture detected by the CM checking unit 61. The controlling unit 65 creates a table (equivalent to the table provided in the determining unit 33 shown in FIG. 9) for managing each advertisement picture. An associated information generating unit 66 generates associated information corresponding to the advertisement picture detected by the CM checking unit 61. Assume that identification information is assigned to each advertisement picture, and character information corresponding to each advertisement picture is prepared in advance. In this case, the associated information generating unit 66 detects the identification information assigned to the advertisement picture detected by the CM checking unit 61, and outputs character information corresponding to the identification information. Or, the associated information generating unit 66 may analyze the contents of the advertisement picture detected by the CM checking unit 61 by using a picture recognition technique or a voice recognition technique, and may generate corresponding associated information.

A time information adding unit 67 adds time information to associated information. This associated information is stored in an associated information storing unit 68. To the table of the controlling unit 65, a pointer pointing to an address at which associated information is stored is registered.

The moving picture data and the associated information, which are stored as described above, are used, for example, by the user terminal 10 shown in FIG. 17. In this case, the moving picture data read from the moving picture data storing unit 64 is transmitted to the display controlling unit 56 via the time information extracting unit 53, and the decoding unit 54. In the meantime, the associated information storing unit 68 shown in FIG. 18 corresponds to the associated information storing unit 57 shown in FIG. 17. Namely, if an advertisement picture is skipped by a user, associated information corresponding to the advertisement picture is read by the associated information reading unit 58, and transmitted to the display controlling unit 56. Then, the display controlling unit 56 outputs the picture to be displayed to the display device 13.

In this way, with the above described storing device, it is possible to make a user view associated information corresponding to an advertisement picture even if TV video pictures, etc., which are broadcast from a broadcasting station, are recorded, and the advertisement picture is skipped when the recorded video pictures are reproduced.

The above described embodiments refer to the configurations where associated information corresponding to an advertisement picture is displayed when the advertisement picture is skipped. However, the present invention is not limited to the case where an advertisement picture is skipped. Namely, the present invention is applied to a configuration where associated information corresponding to a particular picture is displayed when the predetermined particular picture included in delivered moving pictures is skipped. Here, the "particular information" is, for example, a portion that a distributor or a sponsor of video picture information desires to make a user particularly view. The "associated information" may be any of character information, a still picture, and a moving picture.

Additionally, the above described embodiments refer to the configurations where associated information corresponding to an advertisement picture is displayed when the advertisement picture is skipped. However, the present invention is not limited to the skip process. Namely, the present invention is also applied to a case where an advertisement picture is reproduced with a special reproduction manner at a user terminal. Here, the "special reproduction manner" includes fast-forward playback. A case where a request of "fast-forward playback" is made from a user is described below.

The user terminal 10 comprises a function for accepting a "fast-forward request" from a user. When the fast-forward request is input, the start time and the end time of a picture to be fast-forwarded is notified to the server device 20. The basic configuration of the server device 20 is the same as that shown in FIG. 6 or 9. In this case, however, the determining unit 33 examines whether or not an advertisement picture is fast-forwarded instead of examining whether or not an advertisement picture is skipped. If the advertisement picture is fast-forwarded, associated information corresponding to the advertisement picture is transmitted to the user terminal 10. As described above, if an advertisement picture is fast-forwarded in the video picture information delivering system in this embodiment, associated information corresponding to the advertisement picture is displayed on the display device 13.

As described above, according to the present invention, if a predetermined particular picture such as an advertisement, etc. is skipped or reproduced with a special reproduction manner, associated information corresponding to the particular picture is displayed. Accordingly, the information associated with the advertisement can be securely conveyed to a user. Additionally, the user can skip or reproduce with a special reproduction manner a moving picture at desired timing even if the particular picture such as an advertisement, etc. is inserted in delivered moving pictures.

What is claimed is:

1. A video picture information receiving apparatus for receiving moving pictures from a server device in a system where the moving pictures are delivered from the server device according to a request from a user, comprising:
    a requesting unit to transmit a request to skip some of the moving pictures to the server device;
    an obtaining unit to obtain associated information corresponding to a particular picture once the predetermined particular picture is included in some of the moving pictures to be skipped;
    a displaying unit to combine the moving pictures after being skipped and the associated information according to a timing of the request to skip and to display the moving pictures with the associated information on a display device; and
    a combining unit to reduce a size of the moving pictures after being skipped, and to arrange the associated information in a marginal region, wherein
    said displaying unit to make the display device display the pictures arranged by said combining unit.

2. The video picture information receiving apparatus according to claim 1, wherein
    said obtaining unit to obtain the associated information from the server device.

3. The video picture information receiving apparatus according to claim 1, further comprising:
    a storing unit to store the associated information; and
    a determining unit to determine whether or not the particular picture is included in the some of the moving pictures to be skipped, wherein
    said obtaining unit to obtain the associated information from said storing unit.

4. The video picture information receiving apparatus according to claim 1, wherein
    the particular picture is an advertisement picture.

5. A video picture information receiving apparatus for receiving moving pictures from a server device in a system where the moving pictures are delivered from the server device according to a request from a user, comprising:
    a requesting unit to transmit a request to specially reproduce some of the moving pictures to the server device;
    an obtaining unit to obtain associated information corresponding to a particular picture once the predetermined particular picture is included in some of the moving pictures to be specially reproduced;
    a displaying unit to combine the moving pictures after being specially reproduced and the associated information according to a timing of the request to specially reproduce and to display the moving pictures with the associated information on a display device; and
    a combining unit to reduce a size of the moving pictures after being skipped, and to arrange the associated information in a marginal region, wherein
    said displaying unit to make the display device display the pictures arranged by said combining unit.

6. A method for receiving moving pictures from a server device in a system where the moving pictures are delivered from the server device according to a request from a user, comprising:
    transmitting a request to skip some of the moving pictures to the server device;
    obtaining associated information corresponding to a particular picture if the predetermined particular picture is included in the some of the moving pictures to be skipped;
    combining the moving pictures after being skipped and the associated information according to a timing of the request to skip;
    displaying the moving pictures with the associated information on a display device;
    reducing a size of the moving pictures after being skipped; and
    arranging the associated information in a marginal region, wherein
    said displaying includes making the display device display the pictures after the reducing.

* * * * *